(12) United States Patent
Ayres et al.

(10) Patent No.: US 9,688,445 B2
(45) Date of Patent: Jun. 27, 2017

(54) FLUID CONTAINER WITH INTERNAL PERFORATED COMPARTMENT

(71) Applicant: Dyln Lifestyle, LLC, Costa Mesa, CA (US)

(72) Inventors: Dorian R. Ayres, Costa Mesa, CA (US); David M. Walker, Newport Beach, CA (US)

(73) Assignee: DYLN LIFESTYLE, LLC, Irvine, CA (US)

( * ) Notice: Subject to any disclaimer, the term of this patent is extended or adjusted under 35 U.S.C. 154(b) by 1049 days.

(21) Appl. No.: 13/918,854

(22) Filed: Jun. 14, 2013

(65) Prior Publication Data
US 2014/0367318 A1    Dec. 18, 2014

(51) Int. Cl.
| | |
|---|---|
| *B65D 39/08* | (2006.01) |
| *B65D 77/04* | (2006.01) |
| *B65D 81/38* | (2006.01) |
| *C02F 1/00* | (2006.01) |
| *C02F 1/68* | (2006.01) |

(52) U.S. Cl.
CPC ......... *B65D 39/08* (2013.01); *B65D 77/0486* (2013.01); *B65D 81/3876* (2013.01); *C02F 1/002* (2013.01); *C02F 1/688* (2013.01)

(58) Field of Classification Search
CPC ....... C02F 1/002; C02F 1/688; B65D 77/0486
USPC ..................... 99/317, 323.1–323.2
See application file for complete search history.

(56) References Cited

U.S. PATENT DOCUMENTS

| 6,333 | A | * | 4/1849 | Andrews | ............ | B01F 3/04808 |
| --- | --- | --- | --- | --- | --- | --- |
| | | | | | | 206/0.5 |
| 19,960 | A | * | 4/1858 | VanAllen | ........... | B65D 77/0486 |
| | | | | | | 222/136 |
| 65,500 | A | * | 6/1867 | Needham | ........... | B65D 77/0486 |
| | | | | | | 220/501 |
| 1,736,381 | A | * | 11/1929 | Thompson | ............. | A47G 19/14 |
| | | | | | | 99/322 |

(Continued)

FOREIGN PATENT DOCUMENTS

KR    2003188810000    7/2003

OTHER PUBLICATIONS

Holsworth, Ralph E., Jr., D.O., "Essesntia Alkaline & Electrolyte Enhanced Premium Water for Hydration: Technical Information", Essentia, vol. 1 Issue 1, Aug. 1999, Copyright 1999 Essentia Water, 7 pages.

*Primary Examiner* — Sean Michalski
(74) *Attorney, Agent, or Firm* — Stetina Brunda Garred & Brucker

(57) ABSTRACT

The present invention provides a container for drinking fluids wherein the container has an integrated interior compartment for storing solid elements used for treating drinking fluids. The interior compartment includes a plurality of perforations that allow the fluid found in the container to flow through the interior compartment to allow such fluid to interact with the contents of the interior chamber. The interior chamber may include a compound for treating the fluid and for forming, for example, alkaline water. The treatment compound is compressed into solid beads that will interact with the drinking fluid but will not substantially dissolve. In one embodiment the treatment compound comprises of Tourmaline, Kaoline, Magnesium, Magnesium Oxide, Silicone Dioxide and Calcium Oxide.

20 Claims, 4 Drawing Sheets

(56) References Cited

U.S. PATENT DOCUMENTS

| | | | | |
|---|---|---|---|---|
| 1,845,019 A * | 2/1932 | Haines | ............... | A47J 31/0576 99/285 |
| 2,090,320 A * | 8/1937 | Amick | ................... | A47J 43/27 215/12.1 |
| 2,137,041 A * | 11/1938 | Barnes | .............. | B65D 77/0486 222/183 |
| 2,576,725 A * | 11/1951 | Schoelies | ........... | B65D 21/0224 206/446 |
| 2,710,109 A * | 6/1955 | Amann | ............. | B65D 77/0486 215/12.1 |
| 2,788,733 A * | 4/1957 | Jacques | .............. | A47J 31/0636 215/360 |
| 2,809,578 A * | 10/1957 | Campbell | ........... | A47J 31/4407 220/522 |
| 2,826,980 A * | 3/1958 | Willman | ............. | A47J 31/4407 220/522 |
| 2,893,331 A * | 7/1959 | Medlock | ............... | A47J 31/005 366/267 |
| 2,967,776 A * | 1/1961 | Utley | .................... | B65D 85/816 206/0.5 |
| 3,181,951 A * | 5/1965 | Gronvold | ................ | A47J 31/20 426/431 |
| 3,224,940 A * | 12/1965 | Ainsworth | .......... | A61K 9/2031 514/772.7 |
| 3,353,475 A * | 11/1967 | Robbins | ................ | A47J 31/053 99/312 |
| 3,915,296 A * | 10/1975 | Spencer | .............. | B65D 85/816 206/217 |
| 4,181,071 A * | 1/1980 | Outlaw | ................. | A47G 19/14 126/348 |
| 4,186,215 A * | 1/1980 | Buchel | ..................... | A23L 2/40 206/217 |
| 4,795,028 A * | 1/1989 | Wittig | ............... | B65D 81/3205 206/217 |
| 4,832,968 A * | 5/1989 | Forage | .................. | B65D 85/73 426/112 |
| 5,746,113 A * | 5/1998 | Ko | ......................... | A47G 19/16 99/279 |
| 5,913,964 A * | 6/1999 | Melton | .................. | A47G 19/16 99/279 |
| 6,112,537 A * | 9/2000 | Broadbent | ............. | B65D 25/08 62/293 |
| 6,145,685 A * | 11/2000 | Dick | .................. | B65D 77/0486 215/10 |
| 6,431,056 B1 * | 8/2002 | Fritschi | .................... | A47J 31/20 99/279 |
| 6,598,418 B2 * | 7/2003 | Holley, Jr. | ......... | B65D 81/3255 62/457.3 |
| 7,055,706 B2 * | 6/2006 | Kurs | .................. | A47G 19/2288 215/14 |
| D592,054 S | 5/2009 | Floyd et al. | | |
| D608,195 S * | 1/2010 | Germann | ........... | B65D 77/0486 D9/443 |
| D612,235 S | 3/2010 | Cresswell et al. | | |
| D614,955 S | 5/2010 | Cresswell et al. | | |
| D616,743 S * | 6/2010 | Cresswell | .......... | B65D 77/0486 D9/443 |
| D616,744 S | 6/2010 | Cresswell et al. | | |
| D620,357 S | 7/2010 | Jewett et al. | | |
| D620,358 S | 7/2010 | Jewett et al. | | |
| D620,798 S | 8/2010 | Cresswell et al. | | |
| D626,416 S | 11/2010 | Cresswell et al. | | |
| 7,895,939 B2 * | 3/2011 | Pan | ........................ | A47J 31/005 99/317 |
| 8,101,222 B2 * | 1/2012 | Burroughs | .......... | A47G 19/2205 206/217 |
| 8,205,542 B2 * | 6/2012 | Gilbert | ..................... | A47J 31/20 99/284 |
| 8,307,755 B2 * | 11/2012 | Shen | ...................... | A47J 31/005 220/501 |
| 8,424,448 B2 * | 4/2013 | Englert | .............. | A47J 27/21041 219/432 |
| 8,720,321 B2 * | 5/2014 | Neace, Jr. | .............. | A47J 31/002 99/296 |
| 8,757,048 B2 * | 6/2014 | Burroughs | ......... | A47G 19/2205 220/703 |
| 9,314,126 B2 * | 4/2016 | Molayem | ........... | A47G 19/2288 |
| 2004/0200232 A1 * | 10/2004 | Gano, III | ........... | B65D 77/0486 62/457.2 |
| 2006/0162572 A1 * | 7/2006 | Chiu Liu | ............... | A47G 19/16 99/317 |
| 2007/0221556 A1 * | 9/2007 | Chung | .................... | C02F 1/003 210/198.1 |
| 2009/0301990 A1 | 12/2009 | Cresswell et al. | | |
| 2010/0000416 A1 * | 1/2010 | Mulhauser | .......... | A47J 31/0573 99/306 |
| 2011/0062043 A1 * | 3/2011 | Bougoulas | ............... | B65D 1/26 206/514 |
| 2012/0234789 A1 * | 9/2012 | Mason | ................... | B65D 77/28 215/229 |
| 2013/0098250 A1 * | 4/2013 | Satoh | ........................ | C02F 1/68 99/323.1 |
| 2013/0206717 A1 * | 8/2013 | Lane | ........................ | A47J 31/18 215/6 |
| 2013/0239821 A1 * | 9/2013 | Boettcher | ............... | A47J 31/20 99/317 |
| 2014/0044837 A1 * | 2/2014 | Weisman | ................ | A47G 19/16 426/79 |
| 2014/0251153 A1 * | 9/2014 | Tien | ..................... | A47J 31/0636 99/322 |
| 2014/0326143 A1 * | 11/2014 | McCrea | ............... | B67D 1/0801 99/317 |
| 2014/0367318 A1 * | 12/2014 | Ayres | ................. | B65D 77/0486 210/198.1 |
| 2015/0208849 A1 * | 7/2015 | Melzer | ................ | A47J 31/4403 99/287 |
| 2016/0120355 A1 * | 5/2016 | Shen | ................... | A47J 31/0636 99/322 |

* cited by examiner

FLUID CONTAINER WITH INTERNAL PERFORATED COMPARTMENT

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field of the Invention

The present invention relates generally to drinking fluid containers, and more particularly to a combination fluid container and water treatment system integrated within a portable stainless steel water vessel. A treatment compound is positioned within the vessel in an interior perforated chamber located in and fixed to the container to interact with a drinking fluid. For example, the container and treatment compound may be used to form alkaline water.

2. Description of the Related Art

Personal hydration includes the need for portable drinking fluid containers and bottles. Because of the sustainability and environmental issues associated with plastic and single use water bottles, consumers are attracted to reusable containers as such as stainless steel water bottles. Also stainless steel bottles can be formed to be free of BPA, lead or other toxins making for a healthier container. In addition, consumers have recognized the health benefits of treated drinking fluids such as alkaline water. In this regard, there is a need in the art for combining the benefits of reusable containers in combination with the easy availability of treated fluids such as alkaline water.

Alkaline water is understood to be beneficial to health for maintaining physical stability and helping to deal with acid buildup in the body in both healthy individuals and those with conditions that cause acidification of the blood. Alkaline water is said to aid in digestion, neutralize acidity, and to also assist in reducing free radicals. In addition, in most instances alkaline water has the characteristic of smaller water clusters, and a pH above 7.0 that has also been identified as allowing the body to more easily absorb the water. Generally, alkaline water is obtained by water electrolysis and/or through chemical treatment by mineral agents. In many prior art devices for creating alkaline water, electricity is used in association with an apparatus, or otherwise have complex structures that are not conducive for treating drinkable fluids in a portable manner. A discussion of the types and systems for creating alkaline water are described in Chung, U.S. Publication No. 2007/0221556, published Sep. 27, 2007, the substance of which is incorporated herein by reference.

Prior art devices also disclose the use of mineral agents in fluid vessels, to allow untreated water to come in contact with the agents to form alkaline water. Such prior art devices however include multi-part structures that are not user friendly and may not remain fixed in a vessel, as intended, or otherwise use an undesirable amount of volume within a vessel and do not facilitate the flow of water around the mineral agents. As such there is a need in the art for the worry free use of a reactive agent in a portable fluid vessel, that will not overtake the functional use of the vessel and use an undesirable amount of volume of the bottle.

BRIEF SUMMARY

The present invention provides a container for drinking fluids wherein the container has an integrated interior compartment for storing solid elements used for treating drinking fluids. The interior compartment includes a plurality of perforations that allow the fluid found in the container to flow through the interior compartment to allow such fluid to interact with the contents of the interior chamber. The interior chamber may include a compound for treating the fluid and for forming, for example, alkaline water. The treatment compound is compressed into solid beads that will interact with the drinking fluid but will not substantially dissolve. In one embodiment the treatment compound comprises of Tourmaline, Kaolinite, Magnesium, Magnesium Oxide, Silicone Dioxide and Calcium Oxide.

The present invention provides a stainless steel container for drinking fluids. The container of the present invention includes an integrated interior compartment for storing solid elements and allowing fluid to flow through the interior compartment. In an embodiment of the invention container includes a vessel body having an opening for receiving a drinking fluid. A threaded neck and matching threaded cap is provided to open and close the container. The vessel body has a sidewall portion and base portion that forming an inner surface and an outer surface of the container. Located at the base of vessel, a stainless steel inner chamber attached to the inner surface of the vessel. The inner chamber includes a plurality of openings to enable the flow of the fluid through the chamber.

The configuration of the inner chamber allows fluid treatment agent, such as a mineral agent to be captured within the chamber. The mineral agent is captured and is not permitted to migrate from the inner chamber to the vessel chamber to prevent the user of the vessel to consume the agent. However, the inner chamber includes perforations to allow for the water or fluid to interact with the agent, such that the agent is able to interact with the water or fluid and provide treatment. The inner chamber is inserted and attached through the mouth or opening of the container, and is releasably secured therein so that the inner chamber can be removed and the fluid treatment agent replaced. The mineral agent, is formed into spherical solid beads to be inserted into the chamber.

The container is of a generally cylindrical shape, with circular cross section. The circular cross section of the vessel can have an increased diameter toward the top of the container as shown in the figures to provide additional volume to the container, since the inner chamber may use some of the vessel volume. The inner chamber structure and the mineral agent contained within the chamber provides a weight offset to allow the container to have a larger diameter toward the top of the vessel. The weight of the inner chamber provides a counter weight to the larger volume are toward the top of the container, a container which increases stability and assist the container from being too top heavy.

The present invention additionally contemplates a method of forming a container for drinking fluids capable of forming treated fluids. The steps of the method include providing an elongated, hollow vessel comprising an integral side wall and a base wall with an opening formed at a top end. Attaching cylindrical well to the bottom interior base of the container. The cylindrical well has an open top and side walls with a formed annular rim. A cylinder, that is capped with a circular insert, and a mineral agent contained therein and is inserted into the cylindrical well that has a diameter slightly larger than the cylinder insert. Deformable tabs attached to the sides of cylinder engage the annular rim to secure said cylinder to said cylindrical base to form a cylindrical inner chamber. The steps can also include populating the inner chamber with a fluid treatment compound such as a mineral agent. The mineral agent can be formed from the compound of the following components Tourmaline, Kaoline, Magnesium, Magnesium Oxide, Silicone Dioxide and Calcium Oxide.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
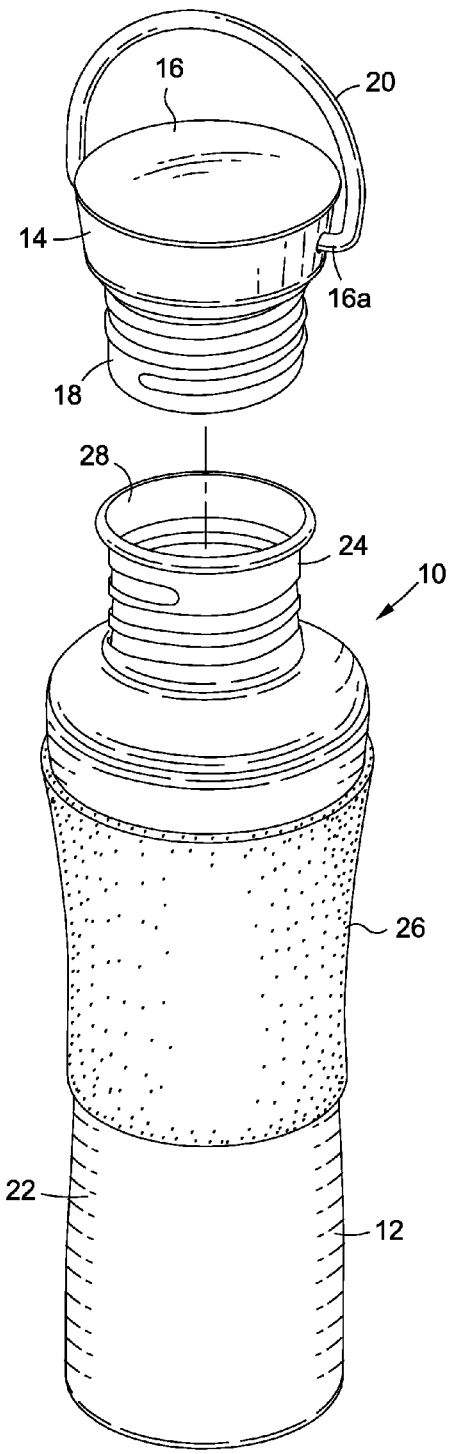
FIG. 1 is a perspective view of the container of the present invention showing the container cap in an exploded view.

Referring to FIG. 1, there is shown a perspective exterior view of the container of the present invention 10. The container 10 comprises a vessel body 12 is shown in exploded relationship with the container cap 14. The container cap 14 includes a cap head 16 interconnected to a threaded insert 18. The cap head 16 includes a cap D ring 20 that is pivotally connected to the cap head 16 at pivot inserts 16a and 16b. The D ring can move laterally and pivot about inserts 16a and 16b to enable the bottle to be handled by the D ring 20. Although it is contemplated that the cap 14 if formed from a unibody stainless steel structure, the cap 14 in combination with the cap head 16 could additionally be formed of natural material such wood or bamboo.

The vessel body 12 is formed from an elongate stainless steel sidewall 22 that is tapered to a neck portion 24. The neck portion 24 is threaded, sized and adapted to interface with the threaded insert 18 of the cap 14. A user can selectively open and close the vessel 12 by securing the cap 14 to the vessel body 12 at the neck portion 24 by rotating the cap 14 in the threaded grooves to form a fluid tight seal to prevent fluid escaping form the vessel 12 when closed. A silicone o-ring may be employed on the underside of the cap head 16 to assist in forming a fluid tight seal. The rigid stainless steel sidewalls 22 can either remain as unfinished stainless steel or can be painted, decaled and/or dyed to create different appearances for the container. Furthermore, the sidewalls 22 can accommodate a silicone cover 26 as shown in FIG. 1 or other such surface covering, such as neoprene, as an example. The cover 26 can be included for decorative purposes, or for including brand information.

Also the cover 26 can serve the purpose of providing a more secure grip of the container 10 and can also assist in minimizing a wet surface caused by a cool liquid inside the container 10 contributing to surface sweating. Also, in the case of warm beverages the cover 26 can serve to provide a gripping surface that will have a temperature lower than the uncovered stainless steel surface.

It is contemplated that the stainless steel vessel 12 can be formed from high quality food-grade stainless steel which is safe, non-toxic and is resistant to absorbing smells and materials placed in the container that could create unwanted flavor to the drinking fluids as might be present in plastics or other materials and surfaces. Stainless steel is otherwise inert to avoid affecting the taste of the drinking fluid or water and is additionally resistant to the elements and corrosion is minimized. The neck portion 24 provides opening for which fluid can be inserted or extracted from the vessel 12 and is wide enough to promote drinking directly from the bottle. Additionally, the wide neck portion 24 facilitates easy cleaning by allowing the insertion of cleaning devices into the vessel 12, as well as permitting access to the base of the vessel 12 to access the insertion and removal of an inner chamber (not shown) which is discussed in greater detail which respect to FIGS. 2-6. If seals used around the mouth of the neck portion 24 and opening 28 when interfacing with the cap 14, food-grade silicone o-ring or similar structure may be used to create a fluid tight seal.

Figure 2:
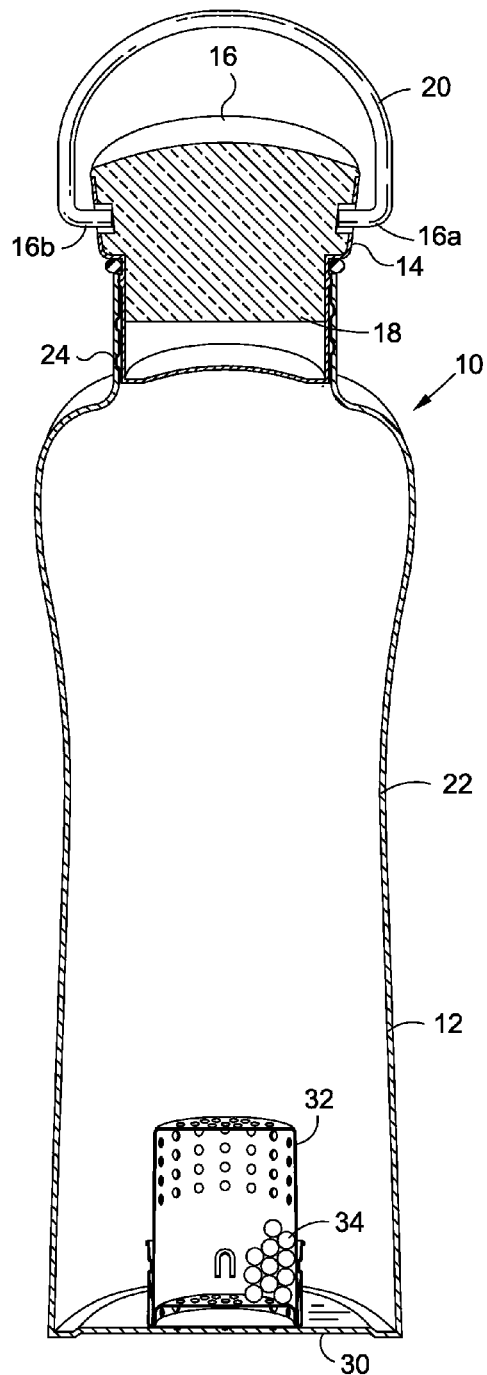
FIG. 2 is a cross-sectional view of the container of the present invention with the cap threaded into a closed position.

The container 10 is of a generally cylindrical shape, with circular cross section. The circular cross section of the vessel as shown in FIGS. 1 and 2 show the sidewalls 22 have an increased diameter toward the top of the container to provide additional volume to the container, since the inner chamber 32 may use some of the vessel 10 volume. The inner chamber 32 structure and the mineral agent 34 contained within the chamber 32 provides a weight offset to allow the container to have a larger diameter or cross section toward the top of the vessel and to provide greater stability and to help avoid the container toppling over when the vessel includes an amount of fluid that reaches the enlarged portion of the container.

Referring particularly to FIG. 2 there is shown a cross-section of the container 10 wherein the vessel body 12 and the cap 14 are engaged in the closed position. The stainless steel sidewalls 22 are welded to a circular base 30 to form a water tight vessel 12. Although present invention constructs the vessel body 12 of the two components of sidewalls 22 and base 30, it is contemplated by the present invention that the vessel body 12 can be constructed from a unitary piece formed in the vessel body shape to avoid the step of welding the base 30 to the sidewalls 22. An inner chamber 32 is affixed to the base 30 as described more particularly in FIGS. 3-4. The inner chamber 32 is generally cylindrical in shape and is adapted to receive mineral agent beads 34 or other materials that can interact with and treat a fluid contained within the vessel. The mineral agent beads 34 are fixedly secured within the inner chamber 32 so not to escape from the inner chamber into the void of the vessel 12. The inner chamber 32 is shown in more detail in FIG. 3. Although the inner chamber is formed into a cylindrical shape, other shapes are equally capable of containing the mineral beads 34 including but not limited to a spherical shape, or a cube shape or any other shapes. Also, although the chamber 32 shows perforations 36 formed equally spaced and set in rows and columns, it is submitted that any type of openings in any pattern which are small enough to keep the beads in the inner chamber is contemplated. The beads 34 are contemplated to be 4-5 mm in diameter, and of a spherical shape, however different sizes and shapes of the beads are contemplated. Also a mesh or wire frame cage is contemplated to keep the beads 34 in the inner chamber 32.

Figure 3:
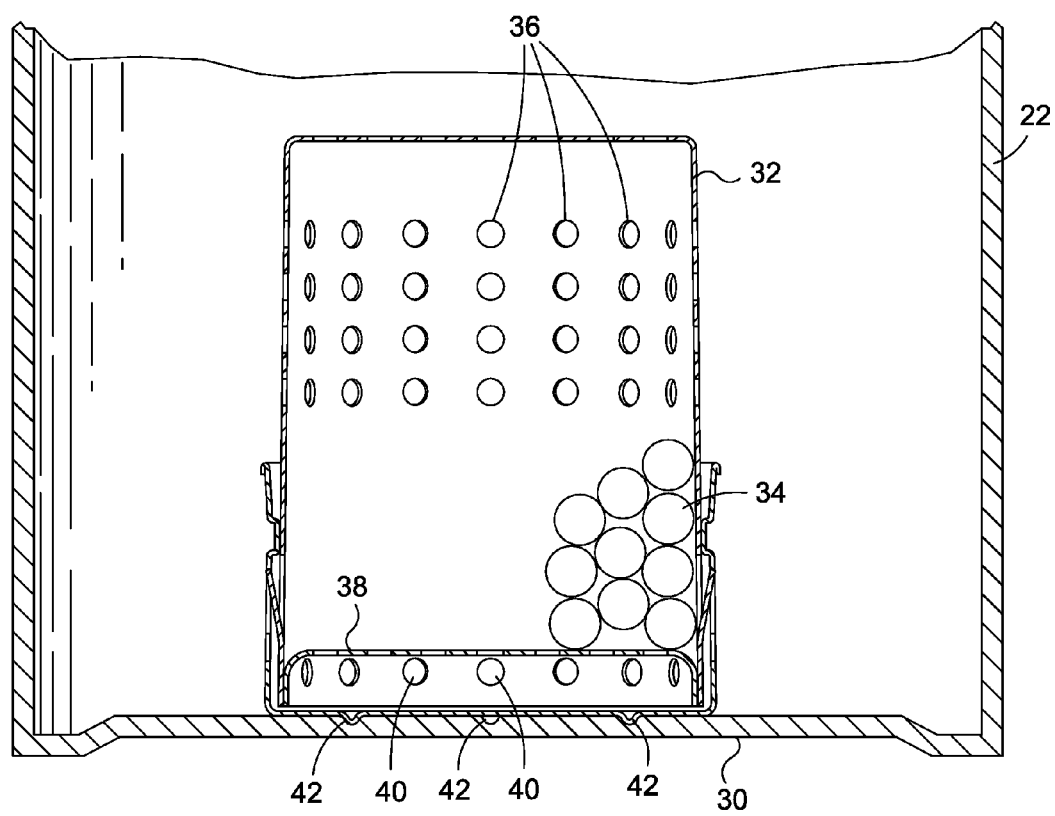
FIG. 3 is an enlarged cross-sectional view of the base of the container of the present invention, additionally showing the detail of the inner chamber.

Referring particularly to FIG. 3, there is shown a cross sectional view of the vessel 12 with side wall 22 and base 30. Also, the inner chamber 32 is shown in cross sectional view incorporating mineral agent beads 34. The mineral agent beads 34 are trapped within the chamber 32 so as to not migrate in the void of the vessel 12. In order to allow the drinkable fluid to interact with the beads 34, side wall perforations 36 are provided in the side wall of the inner chamber 32 to permit fluid to flow through the chamber and for the fluid to interact with the mineral agent beads 34. A circular insert 38 is provided within the chamber 32 to enclose the chamber 32 and trap the beads 34 within the chamber, and to support the mineral agent beads 34 above the base 30 to permit water flow at the base of the chamber 32 through base perforations 40 and up through perforations in the insert 38 (not shown) described in more detail in FIG. 6. The bottom portion of the chamber 32 is welded to the base 30 at weld points 42 formed in the base 30 for purposes of accepting a rigid connection with the chamber 32. Although the weld points 42 are shown in FIG. 4, the invention contemplates additional patterns of welding the chamber 32 to the base.

The beads 34 are formed from mineral agents bound together in solid form, of a size large enough to avoid migrating through the perforations 36, or other perforations of the chamber 32. The beads interact with the drinkable fluid or water to form alkaline fluid that has certain health benefits described in the background of the invention. The beads 34 are formed from at least one or more of the following components Tourmaline, Kaolinite ($Al_2Si_2O_5(OH)_4$), Magnesium (Mg), Magnesium Oxide (MgO), Silicone Dioxide (SiO2) and Calcium Oxide (CaO). Although the present invention contemplates the forgoing mineral agents, it is submitted that the invention contemplates the use of other mineral agents or compounds that are reactive to fluids in the formulation of the beads 34.

Figure 4:
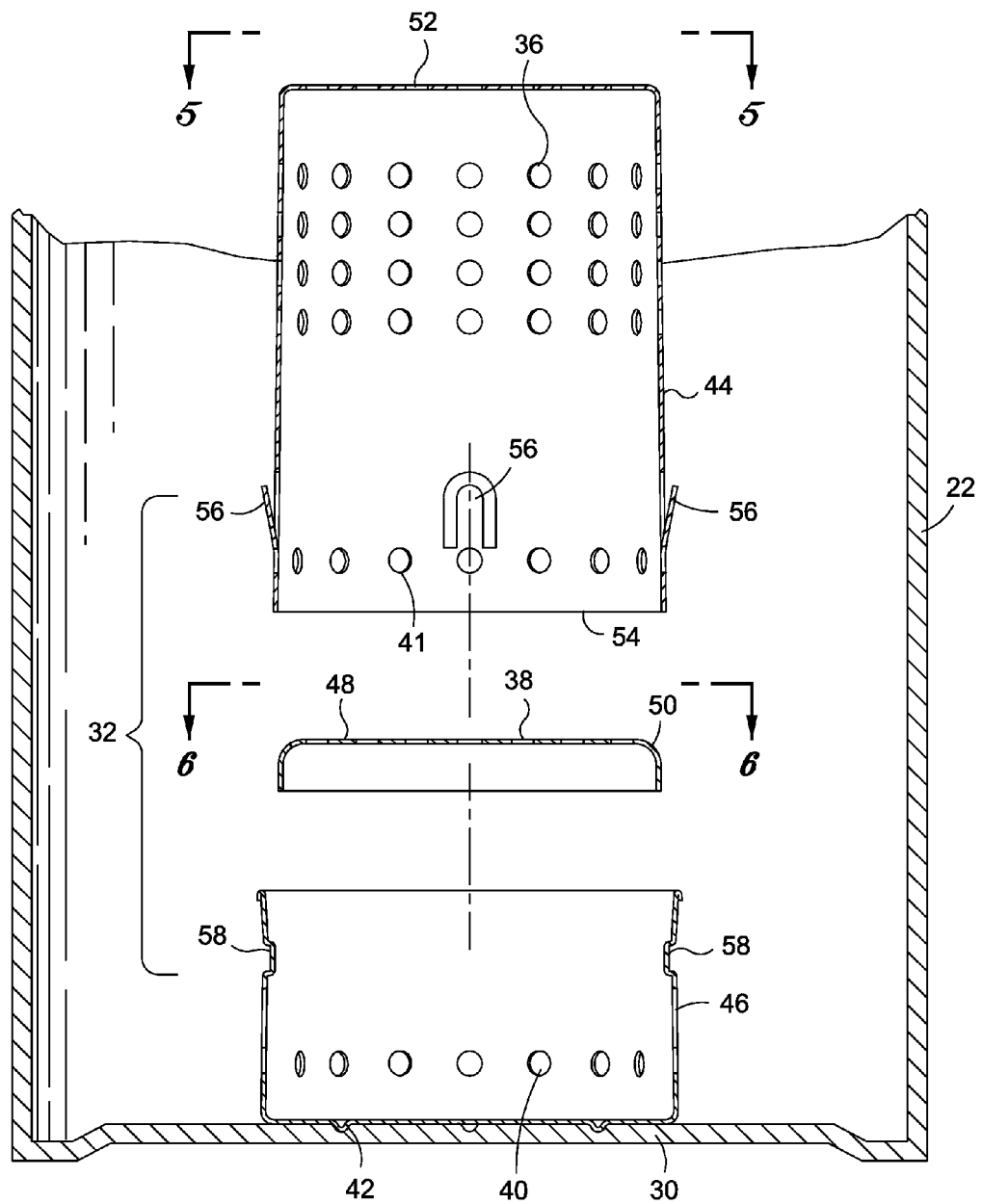
FIG. 4 is a cross-sectional view of the base of the container of the present invention with the inner chamber shown in exploded view.

Referring to FIG. 4, there is shown an exploded view of the components of the chamber 32. The components of the chamber 32 include a top cylinder 44, circular insert 38 and base well 46. The base well 46 is interconnected to base 30. During assembly of the container 10 of the present invention, the base 30 is welded to the sidewalls 22. The base well 46 is then connected to the base 30 by welding or other means. Of the three components of the chamber 32, the base well 46 has the largest diameter, large enough to receive the top cylinder 44 and the insert 38 has the smallest diameter to be received in top cylinder 44. The circular insert 38 is sized to be received and frictionally fit within the top cylinder 44. It is contemplated by the present invention that the beads 34 would be placed in top cylinder 44, and the cylinder is capped by the circular insert 38 to trap the beads in the cylinder 44, and then the cylinder 44 with the insert 38 is releasably received into the base well 46. The cylinder 44, with the combination of the insert 38 and internal beads 34 is introduced into the vessel 10 through the opening 28 to engage with the base well 46. Likewise the cylinder 44 with the combination of the insert 38 and internal beads 34 can be removed through the opening 28 of vessel 10.

Figure 6:
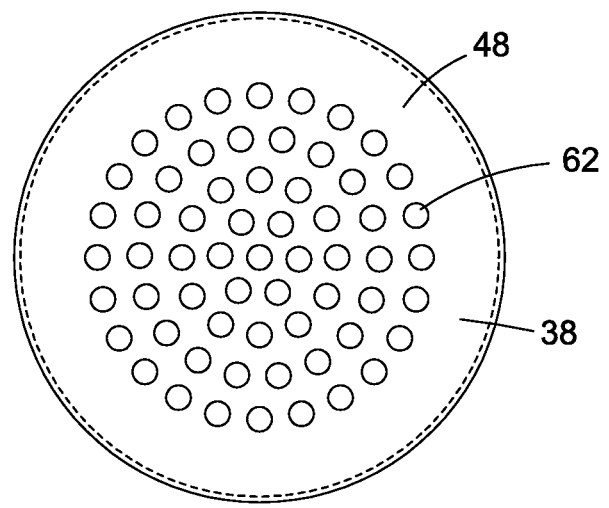
FIG. 6 is a top view of the circular insert that is used within the inner chamber of the container of the present invention.

The insert 38 has a perforated flat top surface 48, shown in FIG. 6 and curved perimeter 50. The curved perimeter 50 is inserted into the top cylinder 44 and rests against bottom of the base well 46, as best shown in FIG. 3. Lower perforations 41 are formed at the base of the top cylinder 44. Because the perimeter 50 is curved it provides clearance to permit fluid flow through the lower perforations 40 of the base well 46 when the top cylinder 44 is inserted into the base well 46 such that the lower perforations 40 are in fluid communication with the lower perforations 41 of the top cylinder 44.

Figure 5:
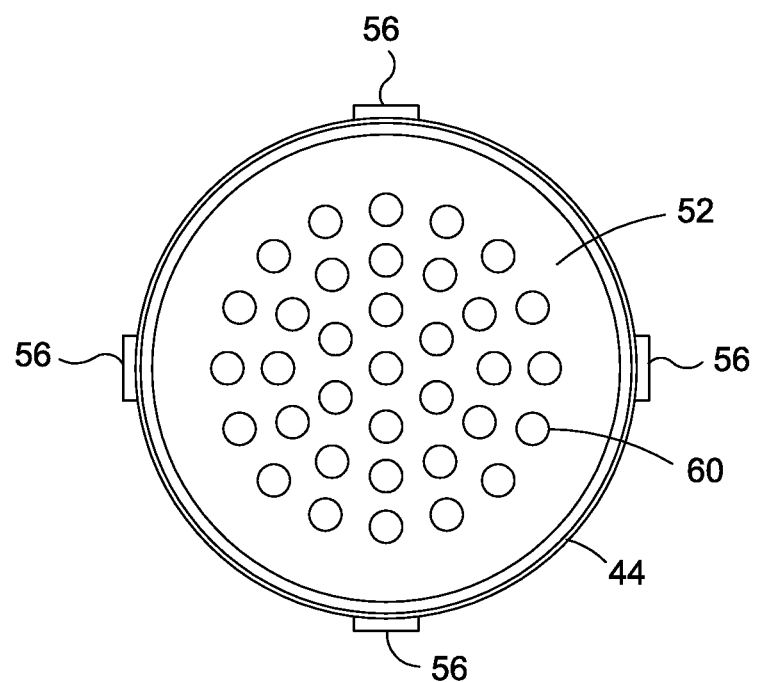
FIG. 5 is a top view of the inner chamber of the container of the present invention.

The top cylinder 44 has a closed top 52 with perforations 60 as shown in FIG. 5. The lower portion of the cylinder 44 has an opening 54 that will be placed over the insert 38. The top cylinder 44 has a lesser diameter than the base well 46, and is sized to be received into the base well 46. In addition four tabs 56 are provided in spaced relation about the side wall of the upper cylinder 44. The tabs 56 are sized and configured to engage an annular recess 58 formed in the sidewalls of the base well 46, to engage the tabs 56 of the top cylinder 44. The tabs 56 are designed to deform back into the sidewall of the top cylinder 44 upon striking the annular recess 58, and then when the cylinder 44 pushed past the annular recess 58, the tabs 56 flay outwardly as shown in FIG. 3, such that the top cylinder 44 is locked into place within the base well 46. It is contemplated that the beads 34 will be placed within the cylinder 44 capped with the insert 38, prior to engaging the base well 46, so that the beads 34 will trapped within the inner chamber 32 once the top cylinder 44 is locked into place with the well base 46.

The top cylinder 44 is releasably secured into the base well 46 with the insert 38 as shown in FIGS. 2 and 3. The top cylinder 44 is held in place by friction and engagement of the tabs 56 with the rim 58. The top cylinder 44 is held in place in secure enough fashion to avoid the cylinder 44 becoming dislodged during normal use of the container 10 of the present invention. The rim 58 shaped such that tabs 56 are not permanently locked into the base well 46, and facilitates the removal of the cylinder 44. The cylinder 44 can be removed by supplying enough pulling force to the cylinder 44 to disengage with the base well 46 and removed from the container 10 through opening 28. As such, the user of the container 10 of the present invention could introduce fresh beads 34 for fluid treatment by either inserting a new top cylinder 44 with insert 38, or the same cylinder 44 with insert 38 after replacing the beads 34.

Referring to FIG. 5, there is shown the top surface 52 of the top cylinder 44 along the view 5-5 as shown in FIG. 4. The top surface 52 includes a plurality of perforations 60 to permit fluid flow through the inner chamber 32. Tabs 56 are shown extending outwardly from the sidewalls of the top cylinder 44. Likewise, as shown in FIG. 6, there is shown the top surface 48 of the insert 38 which also includes perforations 62 formed in the surface 48 to promote fluid flow between the vessel 22 and the inner chamber 32.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combinations described herein. Thus, the scope of the claims is not to be limited by the illustrated embodiments.

What is claimed is:

1. A container for drinking fluids comprising:
   a. an elongated, hollow vessel comprising a side wall and a base wall with an opening formed at a top end;
   b. a base well having a first diameter, an open top, and a well side wall, said base well attached to said base wall within the hollow vessel, said well side wall having at least one annular rim formed therein; and c. a chamber top having a second diameter smaller than the first diameter and an open bottom and a chamber side wall, said chamber side wall having at least one deformable tab formed therein for engaging the at least one annular rim of the base well to fixedly secure the chamber top to said base well to form an inner chamber within said hollow vessel.

2. The container of claim 1 wherein said base well and said chamber top include perforations for permitting fluid flow between the hollow vessel and the inner chamber.

3. The container of claim 2 wherein said inner chamber stores a fluid treatment compound.

4. The container of claim 3 wherein the fluid treatment compound is formed into solid beads.

5. The container of claim 2 wherein said fluid treatment compound is a mineral agent.

6. The container of claim 5 wherein the mineral agent comprises Tourmaline, Kaoline, Magnesium, Magnesium Oxide, Silicone Dioxide and Calcium Oxide.

7. The container of claim 1 further comprising a cap for selectively opening and closing the container.

8. A container for drinking fluids comprising:
 a. an elongated, hollow vessel comprising a side wall and a base wall with an opening formed at a top end;
 b. a base well having a first diameter, an open top, and a well side wall, said base well attached to said base wall within the hollow vessel, said well side wall having at least one rim formed therein; and
 c. a chamber body having a second diameter smaller than the first diameter and a chamber side wall, said chamber side wall having at least one deformable tab formed therein for engaging the at least one rim of the base well to secure the chamber body to said base well.

9. The container of claim 8 wherein said base well and said chamber body include perforations for permitting fluid flow between the hollow vessel chamber and the chamber body.

10. The container of claim 9 wherein said chamber body stores a fluid treatment compound.

11. The container of claim 10 wherein the fluid treatment compound is formed into solid beads.

12. The container of claim 9 wherein said fluid treatment compound is a mineral agent.

13. The container of claim 12 wherein the mineral agent comprises Tourmaline, Kaoline, Magnesium, Magnesium Oxide, Silicone Dioxide and Calcium Oxide.

14. The container of claim 8 further comprising a cap for selectively opening and closing the container.

15. A container for drinking fluids comprising:
 a. an elongated, hollow vessel comprising a side wall and a base wall with an opening formed at a top end;
 b. a base well having a first diameter, an open top, and a well side wall, said base well attached to said base wall within the hollow vessel; and
 c. a chamber body having a second diameter smaller than the first diameter and a chamber side wall, said chamber side wall having at least one deformable tab formed therein for engaging the well side wall to secure the chamber body to said base well.

16. The container of claim 15, wherein the well side wall is of a non-uniform diameter to facilitate engagement with the at least one deformable tab of the chamber side wall.

17. The container of claim 16, wherein the well side wall includes a rim.

18. The container of claim 15 wherein said base well and said chamber body include perforations for permitting fluid flow between the hollow vessel and the chamber body.

19. The container of claim 18 wherein said chamber body stores a fluid treatment compound.

20. The container of claim 19 wherein the fluid treatment compound is formed into solid beads.

* * * * *